United States Patent [19]

Uchida et al.

[11] 4,109,801

[45] Aug. 29, 1978

[54] STEEL SHAPE STACKING APPARATUS

[75] Inventors: Tsutomu Uchida, Matsudo; Zenichi Ono, Kawaguchi; Makoto Nagashima, Ageo; Eiji Tasaka; Shigeo Mitsui, both of Kawaguchi; Keiichi Nomura, Urawa, all of Japan

[73] Assignee: Toshin Seiko Kabushiki Kaisha, Japan

[21] Appl. No.: 721,585

[22] Filed: Sep. 8, 1976

[30] Foreign Application Priority Data

Sep. 10, 1975 [JP] Japan ................................ 50-108873

[51] Int. Cl.² ............................................. B65G 57/04
[52] U.S. Cl. ................................... 214/6 FS; 214/6 N
[58] Field of Search ................. 214/6 FS, 6 PS, 6 N, 214/6 DK, 6.5; 198/460

[56] References Cited

U.S. PATENT DOCUMENTS

| 2,559,460 | 7/1951 | Peterson | 214/6 FS |
|---|---|---|---|
| 3,362,707 | 1/1968 | Louren | 214/6 DK |
| 3,452,884 | 7/1969 | Tanqueray | 214/6.5 |
| 3,610,443 | 10/1971 | Berge et al. | 214/6 DK |
| 3,752,295 | 8/1973 | Hubbell et al. | 198/460 |

FOREIGN PATENT DOCUMENTS 960,727  6/1964  United Kingdom .................. 214/6 H

*Primary Examiner*—Drayton E. Hoffman
*Assistant Examiner*—Ross Weaver
*Attorney, Agent, or Firm*—Haseltine, Lake & Waters

[57] ABSTRACT

An apparatus for automatically stacking steel shapes, preferably, steel angles, comprises an endless conveyor running obliquely towards the traveling direction, a member provided above the conveyor at a proper distance to form a passage, this member serving to prevent steel shapes from overlapping, a stand-by stop lever for keeping steel shapes stopped at an intermediate part of the conveyor, assorting stop levers disposed so as to project from a part of the passage upstream from the stand-by stop lever, a take-out stop member for stopping the steel shapes being conveyed upon retraction of the stand-by stop lever, a stacking lifter located downstream of the conveyor with a certain distance therebetween, a stacking lever for transferring the steel shapes stopped on the conveyor by the take-out stop member to the stacking lifter, a magnet lever for stacking upside-down the steel shapes on the lifter as the occasion demands, and a guide plate for stacking positively and in order the steel shapes from the lever on the stacking lifter.

2 Claims, 5 Drawing Figures

STEEL SHAPE STACKING APPARATUS

BACKGROUND OF THE INVENTION

This invention relates generally to apparatuses for automatically stacking steel shapes conveyed continuously with high precision, particularly to an apparatus adapted to stack small-size steel shapes each having, for example, 25–60 mm width of the flange.

Generally, when steel shapes are forwarded as goods, they are handled in units of bundles each of predetermind weight or number of pieces, and, accordingly, it is necessary to stack and bundle successively the continuously produced steel shapes in a desired form.

Conventionally, these processes in the final stage of a rolling process have been done manually or mechanically in part but have been inefficient. Furthermore, an apparatus of this type in which a part of the process is mechanized has a complex structure, and, in addition, the processing cycle is slow, whereby, even if rationalization and improvement in the rolling process are achieved, the result is a reduction in the efficiency in the final stage.

SUMMARY OF THE INVENTION

An object of this invention is to provide an apparatus by which steel shapes can be stacked with high precision and efficiency to overcome the difficulties accompanying a conventional apparatus as described above.

In accordance with the present invention, this object is achieved by providing an apparatus in which a predetermined number of steel shapes being continuously conveyed are caused to stand by on a conveyer in side-by-side alignment with each other and are then fed to a stacking step by releasing the stopping force applied to the foremost steel shape of this first predetermined number of steel shapes, while the steel shapes positioned continuously to and behind this first group are prevented from advancing. After being conveyed, the first group of steel shapes is taken out from the conveyor by means of a stacking lever thereby to form one stack layer and then is placed on a stacking lifter by said stacking lever, returning-motion of said lever being made quick, and the same process with respect to the succeeding continuously conveyed steel shapes is carried out thereby to stack successive layers of steel shapes on the first layer one upon the other to obtain a desired number of layers.

Further, according to the present invention, a stable stacking state can be obtained in the stacking process by interposing a layer of inverted steel shapes between layers of normally orientated steel shapes either in alternating layers or at certain intervals.

The nature, utility and further features of the invention will be apparent from the following detailed description with respect to a preferred embodiment of the invention when read in conjunction with the accompanying drawings briefly described hereinbelow.

DETAILED DESCRIPTION

Figure 1:
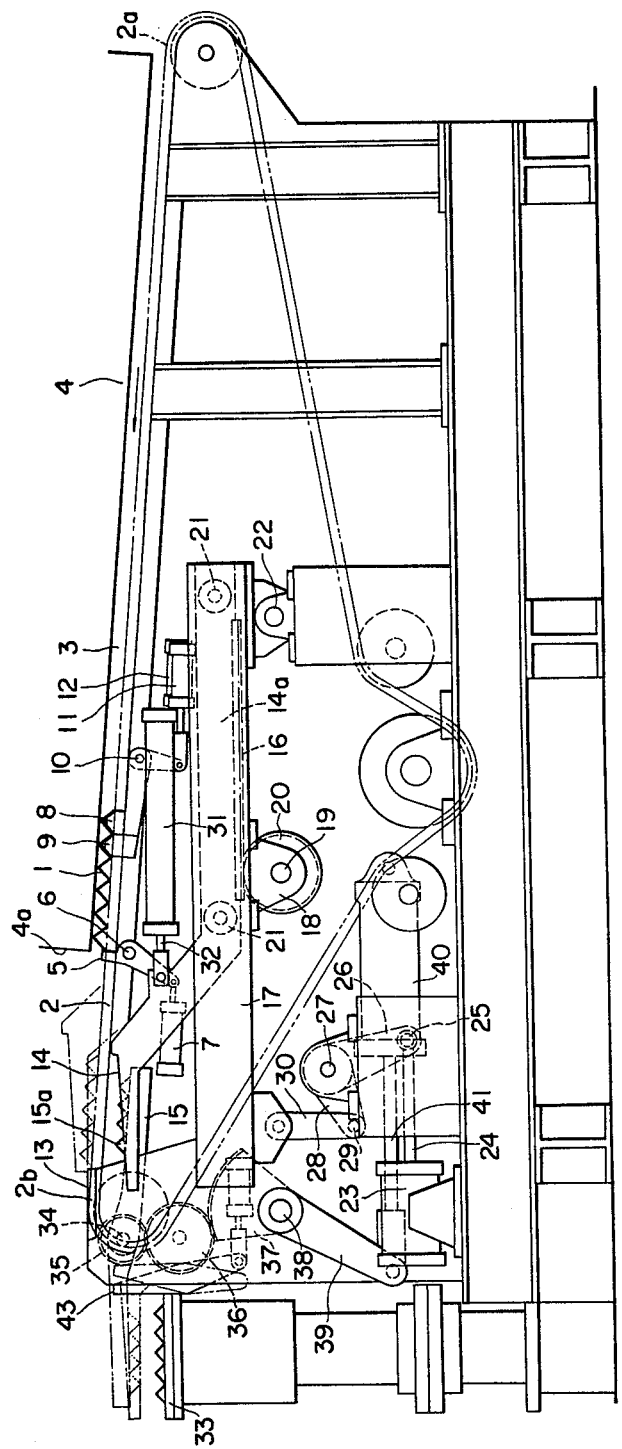
FIG. 1 is a side elevation, with parts cut away, showing the essential parts and organization of one example of the steel shape stacking apparatus according to the present invention.
Figure 2:
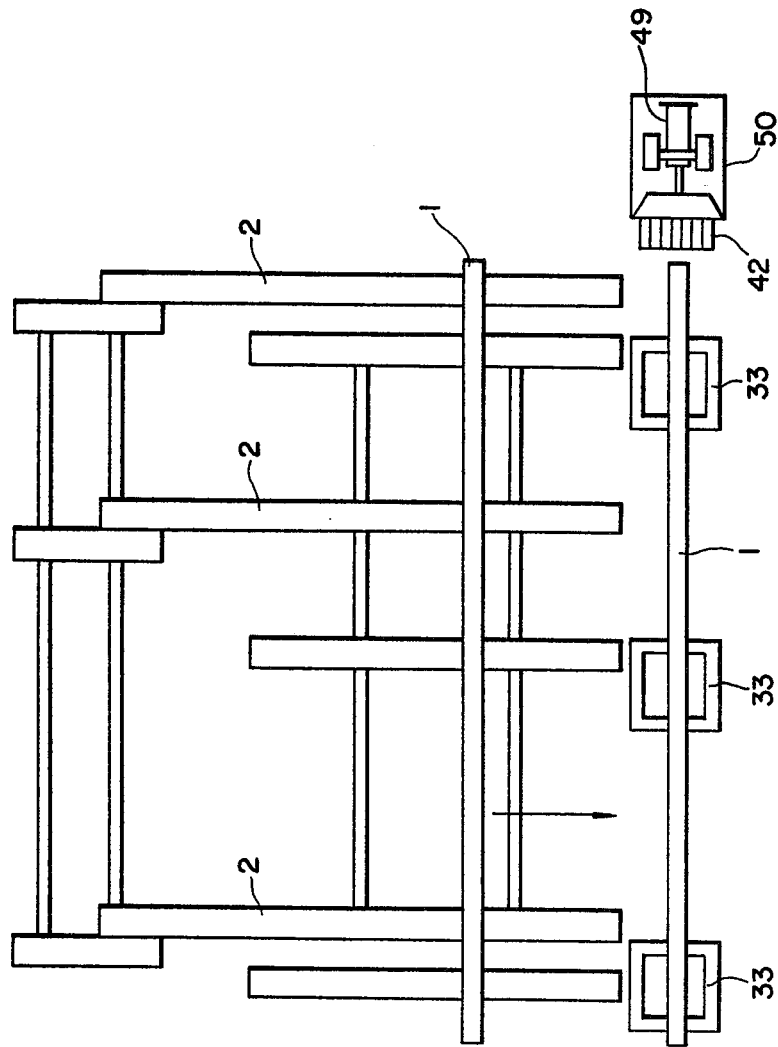
FIG. 2 is a schematic plan view showing a stacking position of steel shapes.
Figure 3:
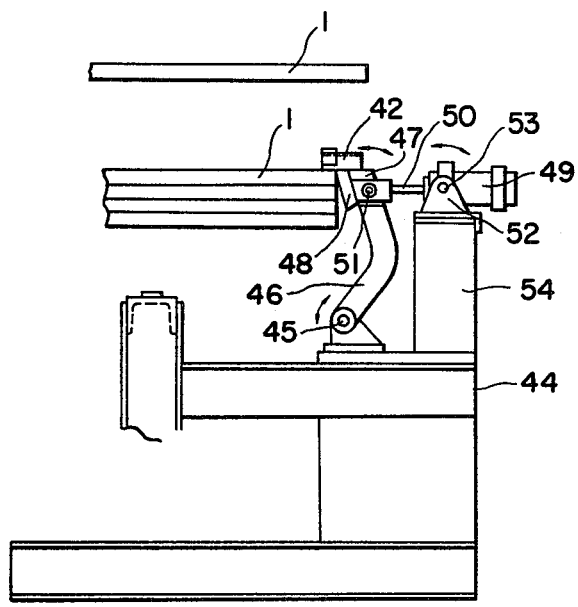
FIG. 3 is an elevation showing the driving mechanism for a guide plate.
Figure 4:
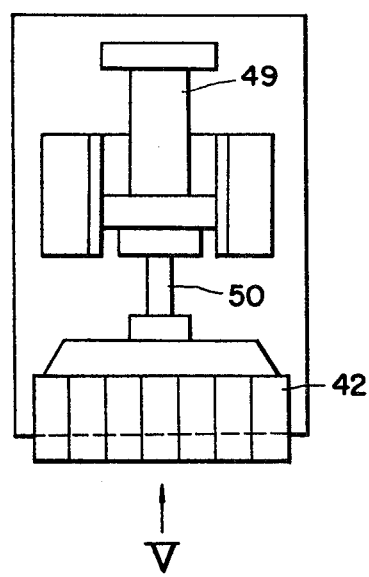
FIG. 4 is a schematic plan view of the driving mechanism shown in FIG. 3.
Figure 5:
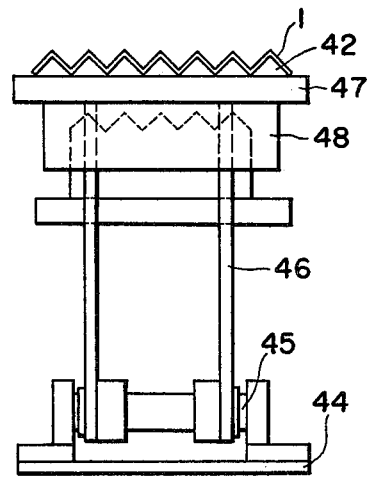
FIG. 5 is an elevation as viewed in the direction of arrow V in FIG. 4.

Referring to FIG. 1, steel shapes 1 to be stacked (hereinbelow called merely steel shapes) are shaped in a rolling plant (not shown) and cut to predetermined dimensions. These steel shapes are thereafter placed on a conveyor 2 with their longitudinal direction transverse to the conveyor and transferred with the space between the two equal flanges of each steel shape facing downward (in this embodiment, a steel shape is preferably an angle with two equal flanges). The conveyor 2 is constructed as an endless chain-conveyor having parallelly spaced chains and inclined upwardly in the travelling direction at an angle of about 5°.

Above the conveyor 2, there is provided with a member 4 for defining a passage 3 with a height such that two steel shapes 1 may be passed therethrough without being stacked. The length along the conveyor 2 of this member 4 is approximately three fourths of the effective conveying length of the conveyor 2 extending from the reversing portion 2a, which is the end of the conveyor 2 on the side of the rolling mill, to the reversing portion 2b, and the height of the member 4 from the conveyor 2 can be adjusted in accordance with the height of the shape steel to be handled. A stop lever 5, which is used for placing the steel shapes in stand-by state (hereinbelow called a stand-by stop lever), is located in the passage of the steel shapes 1 to be conveyed on the conveyor 2 and directly below the downstream end 4a of the member 4 so that one end thereof projects through the conveyor 2 as the occasion demands. The operation of the stand-by stop lever 5 is as follows:

The stand-by stop lever 5 is retracted from the passage of the steel shapes 1 by rotating it counter-clockwisely as viewed in FIG. 1, the center of which rotation is a pivot 6 of the stop lever 5, and is projected into the passage by rotating it clockwisely to prevent the steel shapes from advancing on the conveyor 2, which state is now illustrated in FIG. 1. The stand-by stop lever 5 can be actuated to perform these operations by the action of an air cylinder 7.

Stop levers 8 and 9 are provided upstream from the position of the stop lever 5 so as to project into or be retracted from the passage 3. These stop levers 8 and 9 operate to allow the advance of a predetermined number of steel shapes 1.

These stop levers 8 and 9 operate as follows.

The stop lever 8 is drawn back from the passage 3 by rotating it counterclockwisely as viewed in FIG. 1 about a pivot 10 and is projected into the passage 3 by rotating the same clockwisely thereby to stop the advance of the steel shapes, which condition is now illustrated in FIG. 1. The stop lever 9 is constructed and operates in substantially the same manner as the stoper lever 8, but this stop lever 9 projects into or is drawn back from the passage 3 at a position which is one steel shape 1 forward of the stop lever 8.

The above described operation of the stop lever 8 is realized by the action of the air cylinder 11, while the operation of the stop lever 9 is performed by the action of an air cylinder 12. The stop levers 8 and 9 take the stand-by positions when the stand-by stop lever 5 is drawn back from the passage to permit the advancement of the steel shapes, and, thus, the advancement of the following steel shapes can be stopped.

In the succeeding stage, when the stop lever 5 projects again, the stop lever 8 or 9 is retracted, and the passage is cleared so that the following steel shapes can advance toward the stand-by stop lever 5. Furthermore, the stop levers 8 and 9 have shapes such that the projecting front ends thereof can be firmly engaged with the internal surfaces of the flanges of a steel shape. The projecting position of the front end of the stop lever 8 is so determined as to stop the advancement of the steel shape which succeeds the predetermined $n$ steel shapes (for instance, in FIG. 1, $n$ represents five steel shapes), which form a first stack layer, downsteam from the steel shape 1 prevented from advancing by its abutting against the stand-by stop lever 5. On the other hand, the projecting position of the front end of the stop lever 9 is so determined as to stop the advancement of the steel shape 1 immediately ahead of the steel shape 1 which is to be engaged by the stop lever 8.

The projecting ends of these stop lever 8 and 9 are attached as attachments in a positionally adjustable manner and can be adjusted when steel shapes of a different size are handled.

Near the downstream reversing portion 2b of the conveyor 2, there is provided a take-out stop 13 for stopping the advancement of $n$ or $n$-1 steel shapes 1 on the conveyor 2.

At a position directly below the portion of the passage 3 slightly upstream from the stop 13, there is provided a stacking lever 14 which operates to lift and take out the $n$ steel shapes 1 conveyed on the conveyor 2, and on one side of this lever 14 there is also mounted a magnet lever 15. It is preferable that these levers 14 and 15 be formed by at least two and, possibly, three through six parallel lever portions so as to support both ends and the central portion of the steel shapes 1.

The lever 14 may be formed by an integral plurality of levers, but such a structure is inconvenient for a long size steel shape because the lever must have a large dimension to support both ends of such a steel shape. Accordingly, it is more advantageous to use a lever comprising independent levers 14 which are synchronized as a single lever. Therefore, in the instant embodiment according to this invention, a single synchronized-drive-type lever 14 is utilized.

A rack 16 is located on the lower surface of the base 14a of each lever portion of the lever 14 and is in engagement with a plurality of pinions 20 provided on a horizontal shaft 19 which is supported through bearings 18, 18 (only one bearing being shown in FIG. 1) by symmetrical guide rails 17 movable up and down.

Wheels 21, 21 are rotatably mounted front and rear with a space therebetween on the base 14a of the outer lever portions of the lever 14. These wheels 21, 21 enable the lever 14 to run on and along the guide rail 17. The rear end of each guide rail 17 is supported by a horizontal pin 22, and the front end thereof is connected to the piston rod 24 of an air cylinder 23 through a lever 26 coupled to this rod 24 by a pin 25, a lever 28 connected unitarily to this lever 26 through a shaft 27 rotatably supported at a stationary position, and a link 30 coupled at its one end to this lever 28 by a pin 29 and at its other end to the front end of the guide rail 17. The front end of each guide rail 17 is forced upwardly when the rod 24 of the air cylinder 23 is retracted. Furthermore, the piston rod 32 of an air cylinder 31 is connected to an intermediate part of the lever 14. The air cylinder 31 is supported on the guide rails 17 and moves up and down in conjunction therewith. Thus, the lever 14 moves upwardly, forwardly, downwardly, and backwardly in accordance with the operations of the air cylinders 23 and 31 so as to trace a rectangle in a vertical plane as viewed in FIG. 1. The backward movement of this lever 14 is made quickly to enable the apparatus of this invention to be driven at high speed, and this quick-return motion of the lever 14 causes the steel shapes to be stacked in an order by manner when the lever 14 is drawn back with the steel shapes remaining on a stack lifter 33. It is therefore necessary to design the lever 14 so that it may be driven at high backward speed. A shock absorber (not shown) is incorporated in the apparatus for cushioning the base 14a, directly or through the rear wheel 21.

On the other hand, the magnet lever 15 is provided with concavities and convexities 15a corresponding to the shape of the steel shapes to be handled so that the $n-1$ steel shapes which are stopped by the stop 13 will be forced upwardly and taken out all at once without causing disorder thereof. The magnet lever 15 rotates by an angle of about 180° about a horizontal pin 34, and the magnet of the magnet lever 15 is rectangular to which the concavities and convexities are provided as attachments which are endowed with magnet force and can be changed in accordance with the size of the steel shape.

To the pin 34 is fixed a spur gear 35 with which a sector wheel 37 is coupled through an intermediate spur gear 36. The sector wheel 37 is fixed to a shaft 38 to which a lever 39 is also secured. The outer end of the lever 39 is coupled to the piston rod 41 of an air cylinder 40, the rear end of which is journaled, and which is swingable up and down in accordance with the movement of the lever 39 caused by the movement of the rod 41. The magnet of the lever 15 is excited, demagnetized or magnetized in the opposite direction by a rectified current with a constant voltage, whereby the steel shapes 1 can be attracted, released or repulsed, respectively.

The air cylinders 23 and 31 start to operate when the first one of a group of $n$ steel shapes reaches the stop 13 and the last one thereof is detected by a limit switch, photoelectric means, or the like, and the air cylinder 40 also starts to operate when the first one of a group of $n-1$ steel shapes reaches the stop 13 and the last one thereof is detected. However, since the fact that the steel shapes 1 reach the stand-by stop lever 5 in accordance with the retraction of the stop lever 8 or 9 after the detection at the stop 13 is detected, the operation of the stop levers 8 and 9 can be optionally changed by a preset sequence control.

The above mentioned stack lifter 33 ascends and descends to change the height by a predetermined amount corresponding to the stacking quantity of the steel shapes and the steel shapes are released so that the steel shapes to be stacked by the lever 14 or magnet lever 15 will always maintain a constant distance between the layer 14 or 15 and the uppermost stack layer of the steel shapes.

In the apparatus according to this invention, as shown in FIGS. 2 through 5, on one side of the lifter 33, there is provided a guide plate 42 which serves to receive thereon temporarily $n$ or $n-1$ steel shapes to be stacked by the lever 14 or magnet lever 15, to stack them directly on the lifter 33 or on steel shapes previously stacked on the lifter 33, and, thereafter, to withdraw from the bottom of the stacked steel shapes 1 in the axial direction of the stacked steel shapes.

The guide plate 42 supports only the ends of the steel shapes reaching the position directly above the lifter 33 and is provided with concavities and convexities having dimension such that they can support $n+2$ through $n+4$ steel shapes.

The guide plate 42 serves principally to prevent disorder of the steel shapes which is liable to occur upon withdrawal of the lever 14 and to improve remarkably the positional control of the steel shapes to be stacked in concert with the action of a withdrawal stop 43. The drive mechanism of the guide plate 42 is described further in detail below. The guide plate 42 is mounted on the upper end of a lever 46 supported pivotably by a pin 45 on a frame 44 provided on one side of the lifter 33. The guide plate 42 is further secured to a guide receiving plate 47 secured to the upper end of the lever 46 and to the upper end of an abutting plate 48 secured to the front surface of the guide receiving plate 47. To the upper end of the lever 46 behind the abutting plate 48, the front end of the piston rod 50 of an air cylinder 49 is coupled by a pin 51. This air cylinder 49 is of trunnion type which is rotatably supported by trunnions 53 on a bracket 52 mounted on a pedestal 54, and the air cylinder 49 is driven in conjunction with the lever 14 and the magnet lever 15.

The apparatus according to this invention operates as follows.

If, when product steel shapes 1 rolled and cut to the predetermined size are fed successively into and along the passage 3, the stand-by stop lever 5 projects above the passage, the steel shapes abut against the stop lever 5 and stop in a slipping condition with respect to the conveyor 2 irrespective of the movement of the conveyor 2, and each following steel shape abuts against the proceeding one and stops.

When detected by a known detector that a desired number of steel shapes (at least $n+1$ steel shapes) are aligned before the stand-by stop lever 5, the air cylinder 11 is driven in response to the detection signal and the stop lever 8 projects and engages with the steel shape 1 directly above (in this case, $(n+1)$th steel shape) to restrict movement of this steel shape.

Simultaneously, the stop lever 5 is drawn back by the action of the air cylinder 7, and $n$ steel shapes are released and advanced on the conveyor and thereafter are stopped in abutment against the stop 13.

When the fact that $n$ steel shapes have reached the stop 13 is detected, the stop lever 8 is drawn back, and the following steel shape moves to the stop lever 5. Upon detection of the arrival of the following steel shape at the stop lever 5, the lever 14 is forced upwardly in accordance with the rising of the front ends of the guide rails 17 due to the operation of the air cylinder 23 and advanced in conjunction with the action of the air cylinder 31. The lever 14 operates to raise upwardly the $n$ steel shapes 1 stopped on the conveyor 2 by the stop 13 and to transfer them above the lifter 33 without disturbing the positions of the steel shapes. In succession to this operation of the lever 14, when the guide rails 17 are lowered in accordance with the operation of the air cylinder 23, $n$ steel shapes on the lever 14 are placed on the lifter 33, and the ends thereof are supported by the guide plate 42 (FIGS. 2 through 5). Then, the lever 14 is caused to return toward the original position by the operation of the air cylinder 31, and $n$ steel shapes 1 on the lever 14 are replaced on the lifter 33 by the withdrawal stop 43. Thus, by the action of the guide plate 42, $n$ steel shapes 1 are placed on the lifter 33 firmly without being disordered.

As mentioned above, when the lever 15 starts the advancing movement, the stand-by stop lever 5 is again drawn back synchronously by the operation of the air cylinder 7, and, simultaneously, the stop lever 8 is projected by the operation of the air cylinder 11. Consequently, a following group of the steel shapes 1 stopped by the stand-by stop lever 5 advance to the stop 13 to await the rising of the lever 14. The lever 14 has already been drawn back, and $n$ steel shapes 1 are resting on the lifter 33.

This course of operations saves time and improves the working capacities.

By repeating the operations mentioned above, groups of $n$ steel shapes are stacked one upon another on the lifter 33.

During the stacking operation, the guide plate 42 supporting the ends of $n$ steel shapes 1 is retracted and drawn away from the bottom of the stacked $n$ steel shapes simultaneously with the return movement of the lever 14 to the original position, and the guide plate 42 waits at the stand-by position for the arrival of the next group of $n$ steel shapes to support them.

The lifter 33, during this operation of the guide plate 42, is lowered by the height of one stack of steel shapes in response to a signal from a control unit (not shown), and, therefore, the distances between the guide plate 42 and the steel shapes on the lifter 33 and between the guide plate 42 and the following $n$ steel shapes on the lever 14 are always kept constant.

By repeating the above described operation, $n$ steel shapes can always be stacked on the lifter 33 one on top of another.

The repetition of this stacking of the steel shapes will give rise to an unstable stacking condition. In actual practice, therefore, the steel shapes are stacked in a manner such that a layer of steel shapes which have been turned over are stacked alternately or at intervals of a number of stack layers on the stacks in the normal state.

In the case of this stacking of inverted steel shapes, the magnet lever 15 is introduced. This magnet lever 15 is used and driven in conjunction with a precontrolled sequence, but in this case, the prescribed number of the steel shapes to be stacked is set at $n-1$ steel shapes. Each steel shape of a group of $n-1$ steel shapes can be stacked so as to contact the flanges of two adjacent steel shapes of the previously stacked steel shaped in normal condition in tight engagement therewith. In this stacking operation, the stop lever 9 is utilized instead of the stop lever 8.

The operation of unloading $n-1$ steel shapes from the conveyor 2 can also be performed similarly as in case of the lever 14. That is, $n-1$ steel shapes in which the first steel shape is stopped in abutment against the stop 13 are attracted and lifted by the magnet lever 15 having an excited magnet and then turned over and supplied onto the lifter 33. Simultaneously, the magnet of the magnet lever 15 is demagnetized, and the $n-1$ steel shapes 1 are stacked on the previously stacked layer of $n$ steel shapes. After releasing $n-1$ steel shapes, the magnet lever 15, turns over again and returns to the original position.

During the operation of the magnet lever 15, the succeeding group of $n$ steel shapes are maintained in the position in abutment against the stop lever 5 and are conveyed to the stop 13 immediately after the magnet lever 15 has returned to its original position.

As is apparent from the foregoing description, the apparatus according to the present invention operates to achieve with high efficiency the stacking of the steel shapes of predetermined constant size. Accordingly, excellent product bundles can be obtained. A further feature of this apparatus is that it can be easily incorporated in a steel shape production line of a conventional apparatus to realize modernization of production of steel shapes.

We claim:

1. An apparatus for automatically stacking steel shapes: which comprises, in combination, an endless conveyor driven by driving means for conveying steel shapes transversely placed thereon; an overlapping member disposed above and along said conveyor to form a passage therebetween for permitting steel shapes to pass without being overlapped; a stand-by stop member adapted to project into said passage for stopping said conveyed steel shapes at an intermediate part of said passage and then to retract from said passage for advancing said stopped steel shapes; assorting stop means adapted to project into said passage at a position upstream of said stand-by stop member and then to retract from said passage, timing of the projection and retraction of said assorting stop means being correlated to timing of the projection and retraction of said stand-by stop member so that upon aligned-stop of a group of steel shapes of a predetermined number by projection of said stand-by stop member said assorting stop means is projected to stop the steel shape just succeeding to said group of steel shapes and said stand-by stop member is retracted to advance said group of steel shapes, and upon completion of advancement of said group of steel shapes said assorting stop means is retracted and said stand-by stop member is projected; a take-out stop member for stopping temporarily said advanced group of the steel shapes at a take-out position; stacking lifter means disposed at a position downstream from said conveyor; stacking lever means adapted to lift said group of steel shapes stopped by said take-out stop member from said conveyor to a level above said stacking lifter, said lever means being adapted to carry out quick retraction and lowering to its original position after lifting of said group of the steel shapes on the stacking lifter means; and driving means for correlating and synchronously driving said stand-by stop member, assorting stop means and said stacking lever means so as to repeat their correlated foregoing operations; said stacking lever means comprising magnetic lever means for stacking said steel shapes of a group in an inverted state on said stacking lifter, said magnetic lever means being used at certain intervals in place of said stacking lever; and said assorting stop means being defined by two switchable stop members adapted to have but one of said members in an actuated state, one of said members corresponding to the number of steel shapes in a group to be stacked by said stacking lever means and the other corresponding to the number of steel shapes in a group to be stacked by said magnetic lever means.

2. An apparatus for automatically stacking steel shapes: which comprises, in combination, an endless conveyor driven by driving means for conveying steel shapes transversely placed thereon; an overlapping member disposed above and along said conveyor to form a passage therebetween for permitting steel shapes to pass without being overlapped; a stand-by stop member adapted to project into said passage for stopping said conveyed steel shapes at an intermediate part of said passage and then to retract from said passage for advancing said stopped steel shapes; assorting stop means adapted to project into said passage at a position upstream of said stand-by stop member and then to retract from said passage, timing of the projection and retraction of said assorting stop means being correlated to timing of the projection and retraction of said stand-by stop member so that upon aligned-stop of a group of steel shapes of a predetermined number by projection of said stand-by stop member said assorting stop means is projected to stop the steel shape just succeeding to said group of steel shapes and said stand-by stop member is retracted to advance said group of steel shapes, and upon completion of advancement of said group of steel shapes said assorting stop means is retracted and said stand-by stop member is projected; a take-out stop member for stopping temporarily said advanced group of the steel shapes at a take-out position; stacking lifter means disposed at a position downstream from said conveyor; stacking lever means adapted to lift said group of steel shapes stopped by said take-out stop member from said conveyor to a level above said stacking lifter, said lever means being adapted to carry out quick retraction and lowering to its original position after lifting of said group of the steel shapes on the stacking lifter means; and driving means for correlating and synchronously driving said stand-by stop member, assorting stop means and said stacking lever means so as to repeat their correlated foregoing operations; guide plate means for advancing to a position for temporarily receiving the ends of said steel shapes from said stacking lever means and to retract from said position, whereby during said stacking operation by said stacking lever means, the ends of steel shapes to be placed on said lifter are supported by said guide plate for subsequent placement on said lifter without being disordered upon retraction of said guide plate.

* * * * *